Nov. 2, 1948.　　　L. E. WILLARD　　　2,452,885
HYDRAULIC SHOCK ABSORBER
Filed Feb. 8, 1946
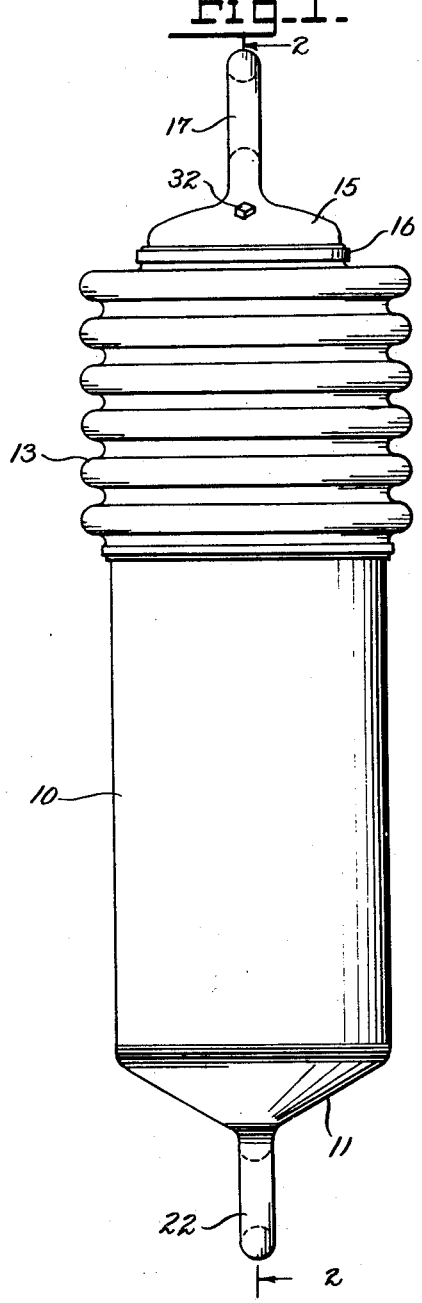
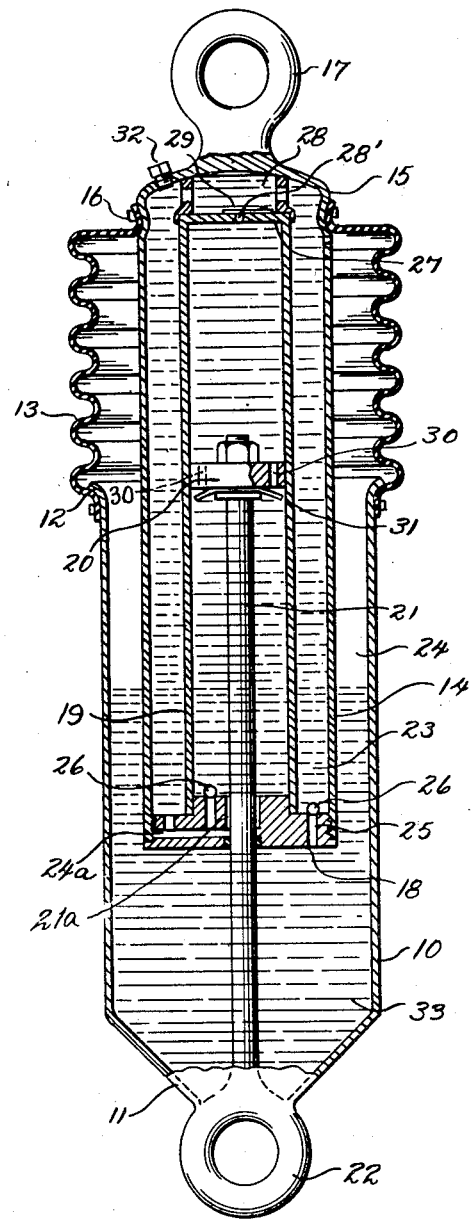
INVENTOR.
Louis E. Willard
BY *Victor J. Evans & Co.*
ATTORNEYS Patented Nov. 2, 1948

2,452,885

UNITED STATES PATENT OFFICE 2,452,885

HYDRAULIC SHOCK ABSORBER

Louis E. Willard, New York, N. Y.

Application February 8, 1946, Serial No. 646,231

2 Claims. (Cl. 188—88)

The invention relates to a shock absorber, and more especially to a hydraulic shock absorber for automobiles or the like.

The primary object of the invention is the provision of a shock absorber of this character, wherein shocks and jars incident to the travel of a vehicle will be absorbed, so as to give an easy and comfortable riding quality to such vehicle, the fluid housed within the absorber being on a tensile or draw side of the piston as well as on the thrust side thereof and splashing of the fluid is entirely eliminated in the working of the absorber.

Another object of the invention is the provision of a shock absorber of this character, wherein the construction thereof is novel and the assembly of its parts unique in many details for the perfect operation, all gases and air being eliminated in the working of such absorber.

A further object of the invention is the provision of a shock absorber of this character, which is simple in construction, thoroughly reliable and efficient in operation, strong, durable, automatic in the working thereof, possessed of few parts, these being accessible, thus minimizing repairs and replacements and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation of the absorber constructed in accordance with the invention.

Figure 2 is a vertical longitudinal sectional view thereof, taken approximately on the line 2—2 of Figure 1 looking in the direction of the arrows.

Similar reference characters indicate corresponding parts throughout the several views in the drawing.

Referring to the drawing in detail, the shock absorber constructed in accordance with the invention comprises a dash pot 10 of substantially cylindrical form, having a tapered closed bottom 11 and an outwardly flared open top 12, respectively while capping this top 12 is a bellows like head 13, preferably made from elastic material, the pot being preferably made from metal.

Centrally located in the head 13 and depending within the pot 10 is a tubiform body 14 which at the upper dome end 15 has fixed thereto the head 13 by a securing band 16, and this dome end 15 is formed with an external eye 17, while at the depending end 18 of such body within the pot 10 rises a piston cylinder 19, its reciprocating piston 20 therein have the stem 21 of the same merging into the closed bottom 11 of the pot 10, the said bottom 11 being formed with an external eye 22. The cylinder 19 is of a cross sectional size with relation to the body 14 to provide a fluid space 23 there between.

The depending end 18 has an annular clearance space 21a about the stem 21.

The pot 10 is of a size with respect to the body 14 in cross-section to create a fluid space 24 therebetween. The bottom end 18 of the body 14 has a passageway 24—a establishing communication with the clearance 21a as well as with space 23 between the cylinder 19 and the body 14. A port 25 is provided in such end 18 forming communication between the space 23 and the pot 10 as best seen in Figure 2 of the drawing. The passage 24—a and the port 25 have cooperating check valves 26.

The cylinder 19 at its top 27 removed from the dome end 15', is built with a by-pass 28, while this top 27 is provided with vent 28' controlled by a check return flap valve 29, the piston 20 being formed with check valved orifices 30, and the valve 31 therefor of the flap type.

The dome end 15 is provided with a removable filling plug 32, so that fluid 33 can be introduced within the shock absorber, preferably by inserting a small spout therein so that air may escape therearound, and the pot and the cylinder 19 are practically filled with oil and also the space 23 so that when the piston 20 reciprocates in the said cylinder all bearing movements to which the absorber is subjected are immersed in oil.

The absorber in its entirety is mounted between relatively movable parts for shock absorbing purposes.

What is claimed is:

1. A shock absorber of the kind described, comprising a dash-pot, closed at its bottom and open at the top thereof, a bellows-like head covering the open top, a tubiform body depending within the pot and attached to the head, a piston cylinder rising within the body and fixed at the bottom of the latter, a piston working within the cylinder and joined with the closed bottom of the pot, the bottom of the cylinder being ported to the body and the pot, check valves controlling said ports and a check valved vent leading from the upper portion of the cylinder to the body.

2. A shock absorber of the kind described, comprising a dash-pot, closed at its bottom and open at the top thereof, a bellows-like head covering the open top, a tubiform body depending within the pot and attached to the head, a piston cylinder rising within the body and fixed at the bottom of the latter, a piston working within the cylinder and joined with the closed bottom of the pot, the bottom of the cylinder being ported to the body and the pot, check valves controlling said ports, a check valved vent leading from the upper portion of the cylinder to the body, and a fluid contained within the pot, body and cylinder.

LOUIS E. WILLARD.

REFERENCES CITED

The following references are of record in the file of this patent:

UNITED STATES PATENTS

| Number | Name | Date |
|---|---|---|
| 1,700,044 | Hales | Jan. 22, 1929 |
| 2,224,305 | Kruger | Dec. 10, 1940 |